United States Patent [19]

Yonezawa

[11] Patent Number: 4,506,871

[45] Date of Patent: Mar. 26, 1985

[54] RETRACTING CLAMP

[75] Inventor: Keitaro Yonezawa, Itamishi, Japan

[73] Assignee: Aioi Seiki Kabushiki Kaisha, Itamishi, Japan

[21] Appl. No.: 493,212

[22] Filed: May 10, 1983

[51] Int. Cl.[3] .......... B23Q 3/08

[52] U.S. Cl. .......... 269/24; 269/32; 269/93; 269/234

[58] Field of Search .......... 269/24, 32, 93, 234; 91/410; 60/588

[56] References Cited

U.S. PATENT DOCUMENTS

| | | | |
|---|---|---|---|
| 3,363,514 | 1/1968 | Ramcke | 91/410 |
| 4,027,867 | 6/1977 | Pollington | 269/234 |
| 4,338,787 | 7/1982 | Kawaguchi | 60/588 |
| 4,365,792 | 12/1982 | Johns | 269/93 |

FOREIGN PATENT DOCUMENTS

| | | | |
|---|---|---|---|
| 163854 | 12/1981 | Japan | 269/234 |
| 933366 | 6/1982 | U.S.S.R. | 269/234 |

*Primary Examiner*—Robert C. Watson
*Attorney, Agent, or Firm*—Bacon & Thomas

[57] ABSTRACT

A retracting clamp suited for clamping a die or a workpiece, a die of an injection molding machine in particular, is disclosed, wherein a hydraulic cylinder is provided in the rear part of a clamp housing, a clamp block is carried slidably by a gently tapered underside of the front part of its piston rod, and the clamp block is urged forward by a spring so as to drive it for clamping at its extruded position and, when clamping is over, the clamp block is retracted to its retracted position and a piston is urged toward the clamping position as necessary by a spring, and the position of the clamp block is detectable by means of limit switches.

8 Claims, 7 Drawing Figures

RETRACTING CLAMP

The present invention relates to a clamp for clamping a die of an injection molding machine or a die casting machine or a workpiece of a machine tool or the like, more particularly to a retracting clamp suited for clamping a die of an injection molding machine.

The procedure of changing a pair of dies used for a horizontal injection molding machine is as follows.

A transport car is stopped on one side of a pair of die fixing plates of the injection molding machine, the existing pair of dies is taken out from the die fixing plates by means of a roller type transport device onto the car and in exchange for that a new pair of dies are brought in between the die fixing plates.

Each die is clamped by of 4 sets of clamp, two upper sets and two lower sets, one each die fixing plate, and a retracting clamp whose clamp arm is retractable into a clamp housing is used lest the clamp's clamp arm should collide with the die as it is taken out or brought in.

The clamp for clamping the die of a vertical press, too, may better be of the retracting clamp type for changing the dies easily.

An example of the conventional retracting clamp is shown in FIG. 7 (U.S. Pat. No. 3,724,837).

This retracting clamp, however, has the following defects.

(1) The length of the moment arm between the shaft pin 224 and the shaft pin' 228 is approximately 0.6–0.7 times the distance between the shaft pin 224 and the clamping portion 218, hence, when, for instance, F=1,000 kgf, f=600–700 kgf. If the moment arm is made larger, the total height of the clamp is increased to be rather bulky. Since the multiplication factor (i.e. f/F ratio) is small, not only the hydraulic cylinder 214 but also the clamps as a whole is increased in size and also increased is the manufacturing cost.

(2) If the pressurized oil should leak through any of the packings in the oil supply channel or the piston packing, the clamping force f is bound to decrease markedly to possibly result in dropping of the die for damage to be caused to the die itself or to the machine, or in displacement of the workpiece with resulting necessity of repositioning it.

SUMMARY OF THE INVENTION

A first object of the present invention is to provide a small yet powerful retracting clamp through miniaturizing a hydraulic cylinder by the use of a wedge mechanism of with a high multiplication factor.

A second object of the present invention is to provide a retracting clamp simple in construction, improved in durability as well as dependability and lower in manufacturing cost.

A third object of the present invention is to provide a highly dependable retracting clamp safe from such as accidental drop of a die by urging the piston rod of a hydraulic cylinder with a spring and multiplying the spring force with a wedge mechanism so that a pretty large clamping force is maintained even in the event of oil leakage.

A fourth object of the present invention is to provide a dependable detecting means for the clamp block in the extruded position as well as retracted position compact in construction and simple in working mechanism by the use of a pair of limit switches.

The retracting clamp of the present invention is of the following constitution.

The retracting clamp comprises a clamp housing, a hydraulic cylinder, a piston rod, a clamp block and a spring.

The clamp housing has a mounting face in the bottom thereof, the hydraulic cylinder formed longitudinally in the rear part thereof and a slide guide bore also longitudinally in the front part thereof, and the clamp housing is provided with a checking part in the bottom of the front part of the slide guide bore.

The hydraulic cylinder is a double-acting hydraulic cylinder.

The piston rod of the hydraulic cylinder is set in the slide guide bore to be slidable longitudinally therein, the part of the piston rod projected beyond the hydraulic cylinder has its underside tapered up toward its front end constituting a slide face, and the slide face is provided with a slide supporting means.

The clamp block has a clamping portion formed on the underside of its front end part and has its topside tapered up towards its front end constituting a forcing face and the forcing face is provided with a slide supported means, and the slide supported means on the forcing face is carried by the slide supporting means in the slide face with the forcing face of the clamp block being in sliding contact with the slide face.

The spring is loaded between the rear end of the clamp block and the piston rod for urging the clamping block forward, the slide face is provided with a catching means facing backward which can engage with a stopper projecting above the forcing face, and a catching hook is provided at the bottom of the rear end of the clamp block.

The clamp block is freely shiftable between an extruded position with the clamping portion extruded forward from the clamp housing and a retracted position with the clamping portion retracted within the clamp housing.

While the piston rod being extruded, the clamp block is urged into the extruded position by the spring where the catching hook of the clamp block is checked by a checking part of the clamp housing, and by extruding further the piston rod, the clamp block is driven downward for clamping through sliding between the slide face and the forcing face.

While the piston rod being retracted, the clamp block is shifted to the retracted position by pushing the stopper with the catching means of the piston rod.

Preferably, the piston rod of the hydraulic cylinder is to be urged forward by a powerful compression coil spring so that a pretty high clamping force is retained even in the event of oil leakage.

It is also preferable to provide a pair of limit switches on one side of the clamp housing with the detector of each limit switch set slidable in the longitudinal horizontal hole in the clamp housing and with the tip of either detector in contact with the side of the clamp block so that when the clamp block is in the extruded position, it can be detected by the detecting means on the corresponding side and the tip of the other detector in contact with the side of the piston rod so that when the piston rod is in the retracted position, it can be detected by the detecting means on the corresponding side.

BRIEF DESCRIPTION OF THE DRAWINGS

FIGS. 1–6 show preferred embodiments of the present invention, while

FIG. 1 is a vertical sectional side view of a retracting clamp.

FIG. 2 is a sectional view taken along the line II—II in FIG. 1.

FIG. 3 is a front view of the retracting clamp.

FIG. 4 is a partial horizontal sectional plan view of the retracting clamp.

FIG. 5 is a partial vertical sectional front view of the retracting clamp.

FIG. 6 is a vertical sectional side view of a modified retracting clamp.

FIG. 7 is a vertical sectional side view of a conventional retracting clamp.

DETAILED DESCRIPTION OF THE INVENTION

Figure 1:
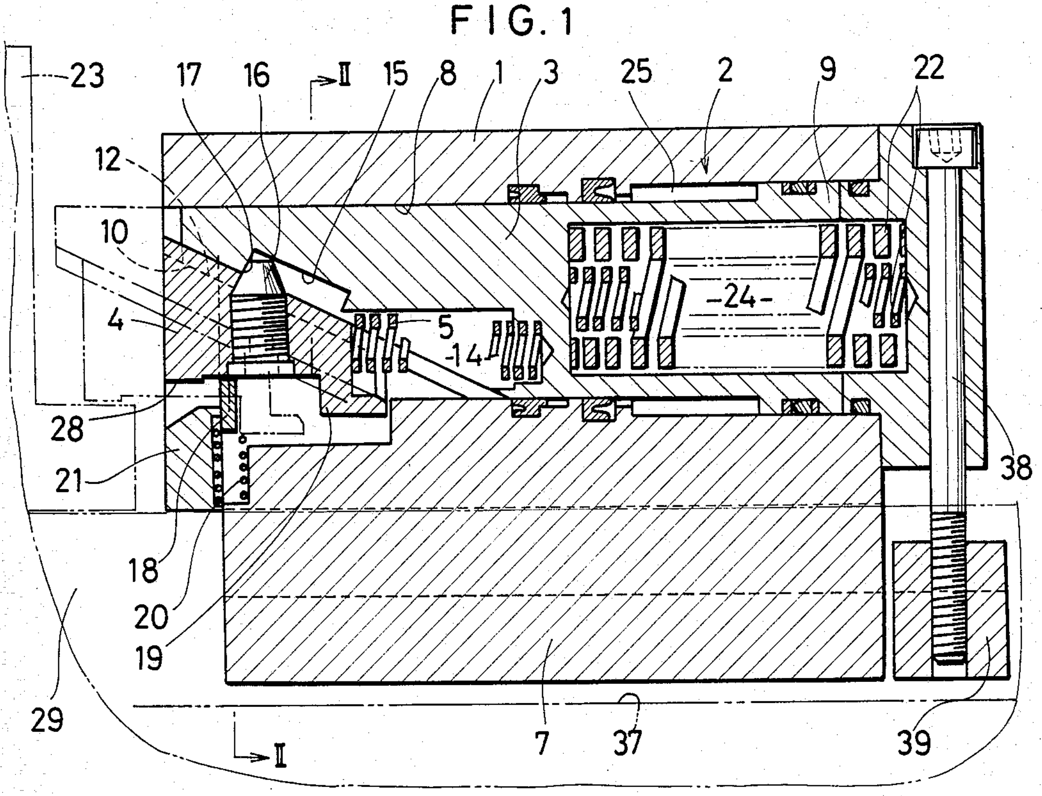
Figure 2:
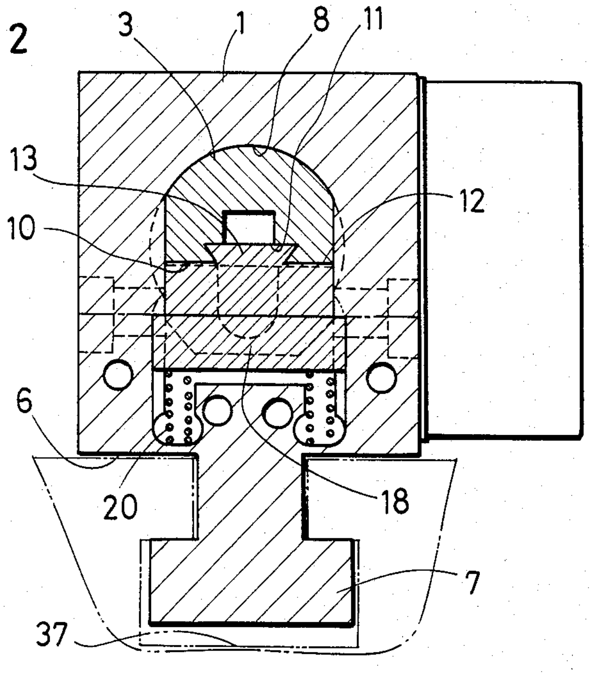
Figure 3:
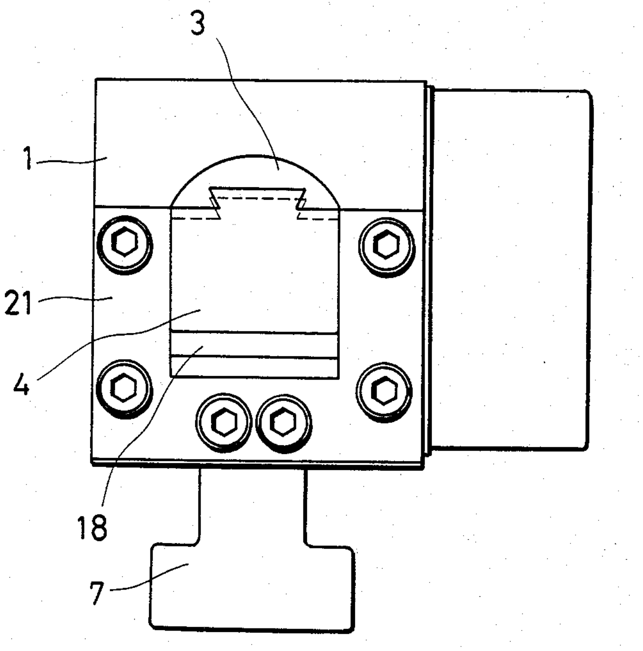

Now referring to FIGS. 1–6, preferred embodiments of the retracting clamp of the present invention are described below in detail.

This retracting clamp is composed essentially of a clamp housing 1, a hydraulic cylinder 2, a piston rod 3 of the hydraulic cylinder 2, a clamp block 4 and a spring 5.

The clamp housing 1 is made of steel and its bottom constitutes a mounting face 6. There is provided a T-sectioned leg 7 projecting downward from the mounting face 6. The clamp housing 1 has formed longitudinally in the rear part thereof a hydraulic cylinder 2, and its piston rod 3 is set in a slide guide bore 8 in the front part of the clamp housing 1 to be slidable longitudinally therein.

The piston rod 3 is completely in the slide guide bore 8 when a piston 9 is retracted to its rearmost position.

The part of the piston rod 3 projecting beyond the hydraulic cylinder 2 constitutes a slide face 10 gently tapered up toward its front end at an angle of approximately 15°–30° with respect to the mounting face 6 and this slide face 10 has a dove tail groove 11 recessed therein along the center thereof.

A projecting dove tail guide 13 is provided on the mating forcing face 12 also tapered up towards its front end along the center thereof. The dove tail guide 13 is engaged in the dove tail groove 11 to be slidable therein for the forcing face 12 to be in slidable contact with the slide face 10.

Between the inner end of a hole 14 provided in the piston rod 3 and the rear end of the clamp block 4 there is loaded a compressed coil spring 5 for urging the clamp block 4 forward. There is provided a recess 15 of a predetermined length in the slide face 10, which is adapted to receive with its front wall 17 the tapered tip of a threaded stopper 16 set through the clamp black 4.

A checking plate 18 is for checking a catching hook 19 of the clamp block 4, also serving as a dust seal, is pressured against the underside of the clamp block 4 by a pair of springs 20, and is checked, in turn, by a front wall 21 secured to the clamp housing 1 with 6 bolts.

The hydraulic cylinder 2 is a double-acting one with its piston 9 urged forward by two sets of powerful clamp springs 22. These clamp springs 22 are for holding the piston rod 3 in the event of oil leakage to thereby ensure against trouble such as dropping or displacement of a die 23. Hence, these clamp springs 22 may possibly be omitted.

For supplying oil to and discharging it from a clamping oil chamber 24 and a retracting oil chamber 25 of the hydraulic cylnder 2 these chambers are provided with respective oil in/outlets 26, 27 to which oil hoses (not shown) are connected.

As the piston rod 3 is extruded by supplying oil to the clamping oil chamber 24 with oil in the retracting oil chamber 25 being discharged, the clamp block 4 is pushed forward by the spring 5 and the clamping portion or face 28, that is, the underside of the front part thereof, is projected beyond the clamp housing 1 to the extruded position (shown by imaginary line) with the catching hook 19 thereof checked by the checking plate 18. When the piston rod 3 is then further driven forward, the sliding face 10 slides against the forceing face 12 within the limit set by the recess 15 and the clamp block 4 is driven thereby downward for the die 23 to be secured against a clamping pallet 29.

The unclamping procedure is as follows.

As oil is supplied progressively to the retracting oil chamber 25 with oil in the clamping chamber 24 being discharged, clamping is released through sliding of the slide face 10 against the forcing face 12 until the stopper 16 comes into contact with the front wall 17 of the recess 15 and the clamp block 4 is pulled back to the retracted position with its clamping portion 28 completely in the clamp housing 1.

Figure 4:
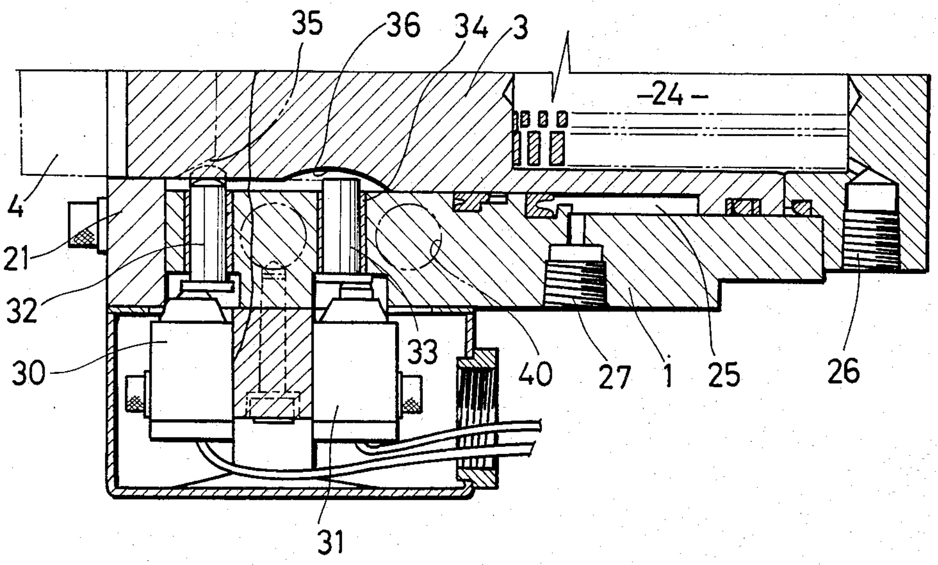
Figure 5:
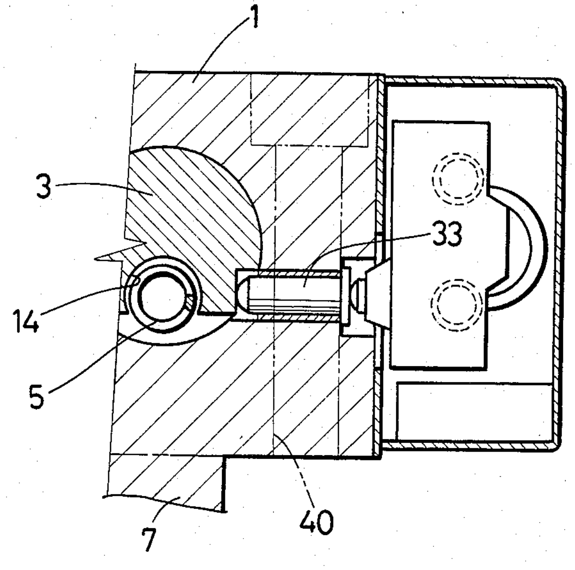

The positions of the clamp block 4 and the piston rod 3 are detected by the pair of limit switches 30, 31 provided on both sides in the clamp housing 1 as shown in FIGS. 4 and 5.

For the purpose, detectors 32, 33 of both limit switches 30, 31 are set in sleeves 34 to be slidable therein, and one of the detectors 32 is brought into contact with the side of the clamp block 4, while the other detector 33 is brought into contact with the side of the piston 3. When the clamp block 4 has been shifted to the extruded position, one detector 32 is actuated by an inclined detecting face 35 thereof, while when the piston rod 3 has been shifted to the rearmost retracted position, the other detector 33 is actuated by a detecting concavity 36 thereof. The hydraulic cylinder 2 of the retracting clamp can thus be controlled for proper operation.

As to the mechanism for securing the retracting clamp to the die fixing plate 29, it is so arranged in this preferred embodiment that the T-sectioned leg 7 is inserted in a mating T-groove 37 and the retracting clamp is secured to the die fixing plate 29 by screwing a fixing bolt 38 set through the clamp housing 1 into a T-sectioned block 39. It is, however, also possible to dispense with the T-sectioned leg 7 and finish the underside of the clamp housing 1 flat, provide bolt holes 40 through the clamp housing 1 on both sides of its slide guide bore 8 as shown in FIGS. 4 and 5 by imaginary line and set bolts therethrough for securing the retracting clamp.

Figure 6:
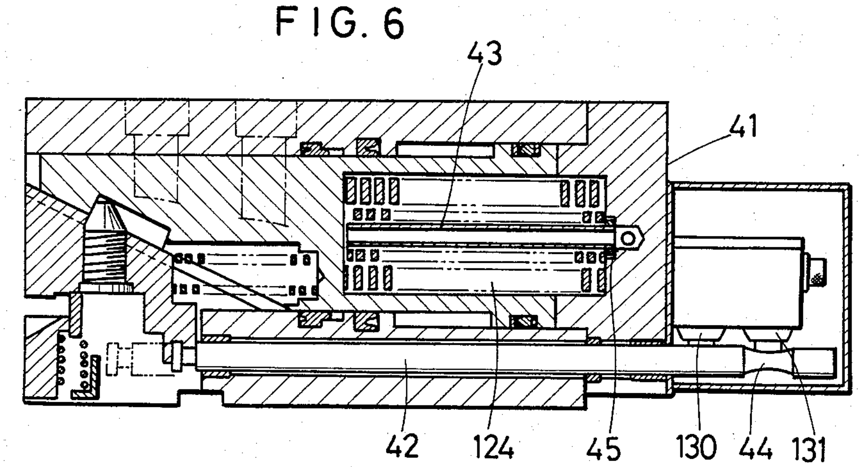
Figure 7:
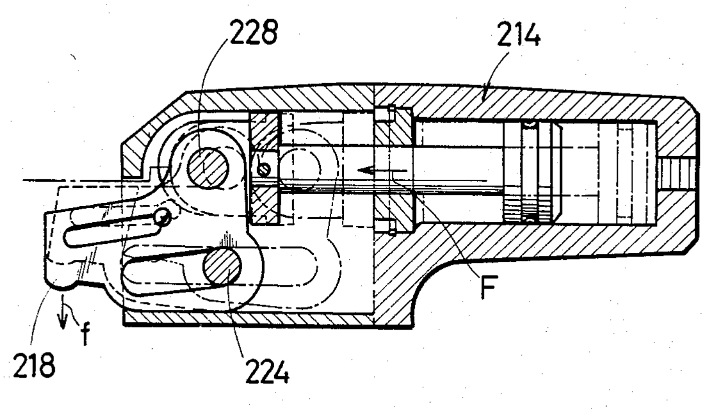
FIG. 7 PRIOR ART
FIG. 7 shows a conventional retracting clamp.

Referring to FIG. 6, a modified embodiment of the retracting clamp is now described.

In this modified embodiment limit switches 130, 131 are attached to a rear end face 41 of the clamp housing 1 with a detection rod 42 set through the clamp housing 1 near its bottom, its front end connected with the clamp block 4 and a detecting concavity 44 provided near its rear end, so as to enable detection of the clamp block 4 being at the extruded position or the retracted position.

For the case where this retracting clamp is secured to the vertical fixing plate of a horizontal injection molding machine a tube 43 is here additionally provided for discharging air collecting in the top of a clamping oil chamber 124. It is so arranged that air is discharged through the gap 45 when the retracting clamp is held upright with its hydraulic cylinder 2 up.

What is claimed is:

1. A retracting clamp for clamping an article to a machine structure comprising:

(a) a clamp housing attached to the machine structure defining therein an hydraulic cylinder and a piston rod bore extending from the hydraulic cylinder to a first end of the clamp housing;

(b) a piston slidably mounted in the hydraulic cylinder;

(c) a piston rod attached to the piston and extending through the piston rod bore, the piston rod defining a tapered slide face adjacent its distal end;

(d) hydraulic supply means to supply a pressurized hydraulic fluid to the hydraulic chamber such that the piston and piston rod are moveable between a retracted position and an extended position;

(e) clamp block means, and, (f) attachment means to slidably attach the clamp block means to the tapered slide face of the piston rod and to slidably retain the clamp block in the clamp housing such that, during a first portion of the movement of the piston rod, the clamp block undergoes translational movement in a first direction and during a final portion of the movement of the piston rod, the clamp block undergoes translational movement in a second direction wherein the attachment means comprises:

(i) first stop means attached to the clamp housing and located so as to contact the clamp block at the end of the first portion of the piston rod movement;

(ii) a sliding groove defined in the tapered slide face of the piston rod;

(iii) a sliding guide formed on the clamp block and slidably retained in the sliding groove, so as to slidably attach the clamp block to the piston rod;

(iv) second stop means attached to the clamp block to limit its sliding movement relative to the tapered slide face of the piston rod; and, (v) first spring biasing means interposed between the clamp block and the piston rod.

2. The retracting clamp according to claim 1 wherein the first stop means comprises:

(a) a stop plate slidably secured to the clamp housing; and, (b) second spring biasing means interposed between the clamp housing and the stop plate to bias the stop plate into contact with the clamp block.

3. The retracting clamp according to claim 1 wherein the second stop means comprises:

(a) a recess defined in the tapered slide face of the piston rod extending generally transversely to the sliding groove therein; and, (b) a stop member attached to the clamp block and extending into the recess.

4. The retracting clamp according to claim 3 further comprising third spring biasing means interposed between the clamp housing and the piston so as to bias the piston and piston rod toward their extended position.

5. The retracting clamp according to claim 3 further comprising:

(a) first and second detector rods slidably mounted in the clamp housing so as to extend into the piston rod bore;

(b) first and second limit switches attached to the clamp housing such that each switch is aligned with a detector rod; and, (c) first and second means defined on the clamp block and the piston rod, respectively, to move the first and second detector rods as the piston rod and clamp block move in the piston rod bore and actuate the first and second limit switches.

6. The retracting clamp according to claim 3 further comprising:

(a) a detector rod slidably mounted in the clamp housing and extending generally parallel to the piston rod, the detector rod defining a detecting concavity adjacent a first end;

(b) attachment means to attach a second end of the detector rod to the clamp block; and, (c) a plurality of limit switches attached to the clamp housing such that they are actuated by the detecting rod as it moves with the clamp block.

7. The retracting clamp according to claim 3 wherein the machine structure defines an inverted "T" shaped slot and further comprising:

(a) a leg extending from the clamp housing, the leg having an inverted "T" cross-section so as to be slidably received in the "T" slot in the machine tool;

(b) a fastening block having a threaded opening and a "T" shaped cross-section slidably disposed in the "T" slot; and, (c) bolt means extending through the clamp housing and threadingly engaging the fastening block so as to attach the clamp housing to the machine tool.

8. The retracting clamp according to claim 3 wherein the machine structure defines a plurality of threaded openings and further comprising:

(a) a plurality of bolt holes defined by the clamp housing; and, (b) bolt means extending through the bolt holes and threadingly engaging the threaded holes defined by the machine tool.

* * * * *